(12) United States Patent
Bristow et al.

(10) Patent No.: US 8,127,128 B2
(45) Date of Patent: Feb. 28, 2012

(54) SYNCHRONIZATION OF SWAPPABLE MODULE IN MODULAR SYSTEM

(75) Inventors: Basheer N. Bristow, Tucson, AZ (US);
Jason J. Graves, Tucson, AZ (US);
Shah Mohammad Rezaul Islam,
Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/434,920

(22) Filed: May 4, 2009

(65) Prior Publication Data

US 2010/0281246 A1 Nov. 4, 2010

(51) Int. Cl.
*G06F 9/00* (2006.01)
(52) U.S. Cl. .......................... 713/100; 713/1
(58) Field of Classification Search ................. 713/100, 713/1
See application file for complete search history.

(56) References Cited

U.S. PATENT DOCUMENTS

| 7,320,085 | B2 * | 1/2008 | Bain ............................. 714/4.4 |
| 7,405,942 | B1 | 7/2008 | Lewis |
| 7,543,046 | B1 * | 6/2009 | Bae et al. ....................... 709/220 |
| 7,627,729 | B2 * | 12/2009 | Bartfai et al. ................. 711/162 |
| 7,870,230 | B2 * | 1/2011 | Rao et al. ...................... 709/220 |
| 2005/0114234 | A1 | 5/2005 | Thomas et al. |
| 2008/0126631 | A1 | 5/2008 | Bailey et al. |

* cited by examiner

*Primary Examiner* — Chun Cao
(74) *Attorney, Agent, or Firm* — Griffiths & Seaton PLLC

(57) ABSTRACT

Exemplary methods, systems, and computer program product embodiments for synchronizing a swappable module between modular computer systems are provided. Each of the embodiments has dual controllers and distributed copies of states. Upon an insertion of the swappable module in a storage system, a plurality of storage components are queried, including a partner swappable module, to determine if a quorum of identification information is present. If the quorum is present, at least one of the plurality of storage components having non-matching identification information is overwritten with the identification information of the quorum. If the quorum is not present, a reset to default procedure is performed. The reset to default procedure designates at least as many storage components of the plurality of storage components with the identification information sufficient to constitute the quorum.

25 Claims, 4 Drawing Sheets

SYNCHRONIZATION OF SWAPPABLE MODULE IN MODULAR SYSTEM

BACKGROUND OF THE INVENTION

1. Field of the Invention

The present invention relates in general to computers, and more particularly to a method, system, and computer program product for synchronization of swappable modules in modular systems, such as a computer storage or processor system.

2. Description of the Related Art

In existing modular systems, many components may be replaceable or swappable. However in many modular systems, component modules are often initialized with data that links the component modules to the given system. Thus when the component is moved to a different modular system, the component retains the identity of the previous system. As an example, in the IBM® BladeCenter® blade server system, the Advanced Management Module (AMM) will write data in a history log persistently stored on a swappable component such as a switch or blade server. This write by the AMM identifies which chassis the switch or blade has been associated with in past operation.

SUMMARY OF THE INVENTION

While the ability to retain identification information for swappable components between modular systems may be acceptable in most cases, there are systems where for proper operation of the swappable module cannot retain a past identity. For instance, returning to the BladeCenter® system, in a RAIDed SAS Switch Module (RSSM), persistent data is initialized at a genesis startup phase that is required for the switch to operate. However, this data links the switch with the BladeCenter® chassis the switch first starts in. If the switch is moved with this persistent data and initialized into another chassis, the switch will not operate properly.

In view of the foregoing, a need exists for a mechanism by which synchronization of persistent data is achieved, so that components such as a RSSM may be interchangeable between modular systems, and yet operate consistently. Accordingly, in one embodiment, by way of example only, a method for synchronizing a swappable module between storage systems is provided. The storage systems have dual controllers and distributed copies of states. Upon an insertion of the swappable module in a storage system, a plurality of storage components are queried, including a partner swappable module, to determine if a quorum of identification information is present. If the quorum is present, at least one of the plurality of storage components having non-matching identification information is overwritten with the identification information of the quorum. If the quorum is not present, a reset to default procedure is performed. The reset to default procedure designates at least as many storage components of the plurality of storage components with the identification information sufficient to constitute the quorum.

In another embodiment, again by way of example only, an additional exemplary embodiment for synchronizing a swappable module between storage systems is provided. Again, the storage systems have dual controllers and distributed copies of states. Upon an insertion of the swappable module in a storage system, a plurality of storage components, including a partner swappable module, is queried to determine if a quorum of identification information is present. If the quorum is present, at least one of the plurality of storage components having non-matching identification information is overwritten with the identification information of the quorum. If the quorum is not present, a reset to default procedure is performed. The reset to default procedure is performed pursuant to a selection of bays in the storage system by a user. If the user selects the reset to default procedure pursuant to a first bay, identification information of one of the plurality of the storage components is used to designate the identification information of the quorum for a remainder of the plurality of the storage components. If the user selects the reset to default procedure pursuant to a second bay, persistent identification information stored in the storage system to is used designate the identification information of the quorum for each of the plurality of the storage components.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only exemplary embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for synchronizing swappable module components, such as the RSSM switch previously described, between modular systems such as computer processing and computer storage systems. These mechanisms may leverage other components of the modular system to determine if a quorum of identification information if present using various techniques as will be described. In this way, the swappable modular component can take on the identity that the modular system defines for that component.

Figure 1:
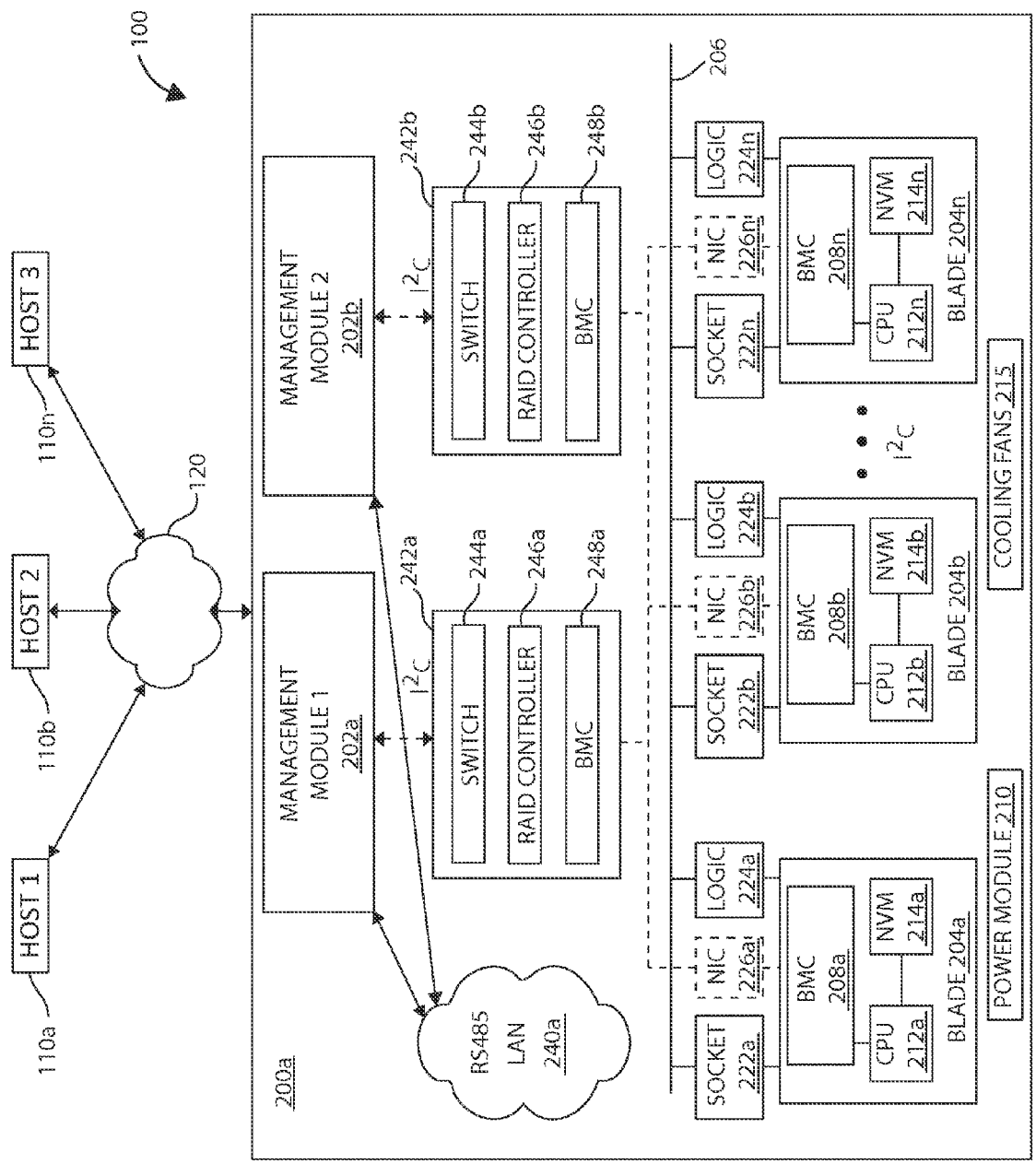
FIG. 1 is an exemplary multi-blade server chassis in which various aspects of the following description and claimed subject matter may be implemented.

FIG. 1 is an exemplary block diagram of an exemplary modular system in which various aspects of the present invention may be implemented. Computing environment 100 has several hosts with access to a multi-blade server chassis. For the sake of clarity, three hosts 110a,b,n are depicted. However, additional hosts may be associated with the chassis as one skilled in the art will appreciate. Hosts 110a,b,n are connected through a network fabric 120 to a multi-blade server blade chassis 200a. Again, for the sake of clarity, only three server blades 204a,b,n are depicted. However, in one embodiment, server blade chassis 200a has a midplane 206 capable of connecting fourteen or more server blades 204.

Server blade chassis 200a has one or more advanced management modules (AMM) 202. In the depicted embodiment, server blade chassis 200a has a primary advanced management module 202a and a back-up advanced management module 202b. Each management module 202 is capable of managing multiple server blades 204. During normal operations, one of the local management modules 202a or 202b are coupled to server blades 204a-n via a Local Area Network (LAN) 240a, a midplane 206, and a plurality of Baseboard Management Controllers (BMCs) 208 (each server blade 204 having a BMC 208) to form an in-band management pathway. LAN 240 and BMC 208 are discussed in further detail below.

Midplane 206 is a backplane, mounted in the middle of server blade chassis 200a, that contains circuitry and sockets 222 into which additional electronic devices or cards, including server blades 204 may be inserted. Midplane 206 contains at least one bus for secure in-band internal communication between management module 202 and server blades 204a-n, as well as between and among server blades 204a-n themselves, via respective BMCs 208a-n.

When a server blade 204 is inserted into a specific socket 222, a physical address is established for that server blade 204. For example, consider server blade 204a being inserted into socket 222a. A control logic 224a detects the presence of server blade 204a in socket 222a. Logic 224a may comport with the Electronics Industry Association (EIA) RS485 Standard for data communication. In other embodiments, Logic 224a may be compliant with the Phillips' Inter-IC (Inter-Integrated Circuit) standard (incorporated by reference in its entirety herein and commonly referred to as "I$^2$C"), or with an Ethernet network standard. Logic 224a, operating in conjunction with management module 202, assigns a physical address on a bus in midplane 206 to server blade 204a when server blade 204a is inserted into socket 222a. Each server blade 204 may be associated with a unique logic 224 that is connected to midplane 206 as depicted in FIG. 2a. Alternatively, all server blades 204 may use a single logic 224.

Each server blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server may be used to assign an IP address to server blade 204a. Communication with server blade 204a is thereafter via a Network Interface Card (NIC) 226a that is associated with server blade 204a.

In accordance with the illustrated embodiment, an I/O module 242a is connected to NIC 226a. Module 242a may be used in pairs (e.g., module 242b) to provide redundancy. I/O module 242a includes an integrated switch module 244a, such as a serial attached SCSI (SAS) switch module. Switch modules 242a, 242b provide connectivity to Ethernet or SAS, for example. RAID controllers 246a and 246b are incorporated into the I/O modules 242a and 242b. The RAID controllers 246a, 246b do not take up a blade slot. RAID controller 246a is interconnected to RAID devices, such as storage devices in a RAID configuration. The RAID devices located within one or more blades 204. The RAID controllers 246a, 246b and attached RAID devices may collectively be thought of as a RAID subsystem of the server blade chassis.

A baseboard management controller (BMC) 248a is also integrated into the I/O module 242a. BMC 248a may be adapted to store IP addresses of various components of chassis 200a in several locations. A copy may be stored in a persistent storage location of each switch module 244a. A copy may be stored in a persistent storage location of RAID controller 246a. A copy may be stored in persistent storage of a media tray (not shown). Similarly, a copy may be stored in switch module 244b and RAID controller 246b. The BMC 248a, in cooperation with the I/O module 242a, controls the process of synchronizing the various copies. In addition to controlling synchronization of component addresses, the BMC 248a, and I/O module 242a may be adapted to perform additional functionality as will be described, following.

Each server blade 204 may have at least one central processing unit (CPU) 212, and a non-volatile memory (NVM) 214. NVM 214 is a Flash Read Only Memory ("Flash ROM" or "Flash Memory") that can be erased and reprogrammed in units of memory referred to as "blocks." NVM 214 may also include non-volatile Electrically Erasable Programmable Read Only Memory (EEPROM) that is similar to Flash Memory, except that EEPROM is erased and rewritten at the byte level and is usually smaller in capacity. The server blade 204 may be oriented as a storage blade (with a number of integrated storage devices such as disk drives) or a processor blade (with one or more processing devices) for performing computing processing.

When a server blade 204 is shipped from a manufacturer, the NVM 214 may be pre-burned with firmware, including a BIOS as well as software for monitoring the server blade 204. Such monitoring may include controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204.

Advanced management modules 202 are capable of detecting the presence, quantity, type and revision level of each server blade 204, power module 210, and midplane 206 in the system. Management modules 202 may also directly control the operation of each server blade 204 and the power module 210, and may directly (without using the BIOS in the server blades 204) or indirectly (using the BIOS) control the operation of cooling fans 215 and other chassis 200a components.

Each server blade 204 has a BMC 208 that provides local supervisory control of the server blade 204 to which the BMC 208 is associated. Each BMC 208 is able to communicate with a local management module 202 by either using communication path 240a (in-band network) or alternatively by using switches 242a and NICs 226 (out-of-band network). The local management modules 202a, 202b may utilize a variety of communications paths 240a, such as an RS485 path 240a, a LAN path 240a and an I$^2$C path 240a to communicate with each blade 204.

LAN 240 is an in-band network also comporting with the Electronics Industry Association (EIA) RS485 Standard for data communication. Management modules 202 (either primary management module 202a or back-up management module 202b if management module 202a is down) communicate via LAN 240 with BMC 208, which includes logic for coordinating communication with server blades 204 via sockets 222.

LAN 240a may be configured to allow communications between server blades 204a-n and the management modules 202a, 202b relating to the remote BIOS settings and BIOS management. The blades 204a-n may leverage BMCs 208a-n as proxies to communicate with the management modules 202a, 202b through the RS485 protocol. Similarly, the management modules may leverage BMCs 208a-n as proxies to communicate with the blades 204a-n through the RS485 protocol. In an alternative embodiment, an RS485 connection may be separately made between each blade 204a-n and the management modules 202a, 202b. Additionally, other communications protocols and paths may be utilized, such as the aforementioned I$^2$C channel or the aforementioned TCP/IP and/or Ethernet channel over switches 244.

Chassis 200a may follow a predetermined policy upon setup in which addresses of various components in the chassis 200a are propagated throughout. For example, in one embodiment, the AMM 202 notifies the switch module 244 of any IP address changes. The switch module 244 in turn notifies the BMC 248. Once the BMC 248 is notified of an IP address change, the BMC 248 queries the IP address information from the switch persistent storage, and updates the component IP address list in another area of the switch persistent storage. The BMC 248 also updates the component IP address list in an area of persistent storage resident in the RAID controller 246. The BMC 248 then notifies the partner I/O module BMC 248 to update its component IP address list. The partner BMC 248 then updates the persistent storage in its associated switch module 244 and RAID controller 246.

In chassis 200a, both switch modules 244a and 244b have access to the management modules 202a and 202b, including information stored within the modules 202a and 202b. The RAID subsystem, including RAID controllers 246a and 246b, does not have this access. Since the RAID subsystem is managed via a different interface, the subsystem has no way of knowing which chassis the subsystem belongs to, which switch 244a or 244b it is packaged with, or what other switches are in the same chassis 200a. The relationship among switches 244a and 244b and their respective RAID subsystems is necessary in order to configure host access to the RAID subsystem, and to perform service and maintenance operations.

To simplify the user experience in managing chassis 200a, an API may be implemented as previously described, that allows switches 244 to access and persist all network information, such as port IP addresses of the devices. For example, in one embodiment, the API may be operational as software, firmware, hardware, or a combination thereof operable on a particular blade 204. In this way, CPU 212 and NVM 214 may be utilized to execute and store processing instructions relating to the operation of the API. The API may be configured to maintain a relationship between the management modules 202 and switches 244. As a result, the API may be adapted to determine information such as port IP addresses from the switches 244 and provide the information as an intermediary to other chassis 200a components, such as the BMCs 248. Exemplary functionality of the API will be later described in the context of executing an exemplary reset to default operation.

The API may be adapted to query the switch(es) 244 for the address or other information, based on initial information provided by a user, such as an initial address. For example, in one embodiment, based on an IP address provided by a user, the API may then query switch(es) 244 for additional addresses of additional components (e.g., remaining 3 IP addresses). The switches 244 may obtain the information from their persistent storage, this storage having been populated by BMCs 248. The API may then validate the information, perhaps notifying the user the additional addresses and that the addresses are valid. The API may then persistently store the addresses in locations accessible by the BMCs 248, the switches 244, and the RAID controllers 246.

In the depicted embodiment, switches 244 may be considered swappable modular components that may be moved from one chassis 200a (modular system) to another. In a genesis phase of operation, in which all the elements of the chassis 200a are newly initialized, one of the BMCs 248, such as BMC 248a depicted in module 242a is the master of the initialization process. In server blade environments, the BMCs 248 may be associated with a particular bay. For example, BMC 248a may be associated with bay 3 of a particular BladeCenter® chassis, while BMC 248b may be associated with bay 4 of the chassis. During the genesis phase in such an implementation, BMC 248 copies factory persistent vital product data (VPD) (herein also referred to generically as "identification information") to the media tray (not shown). This VPD data includes key fields that distinctly identify the system, such as a license key, machine signature, and worldwide name (WWN) information. Again, this information is referred to herein as identification information.

In one embodiment, after the master BMC has initialized the media tray and set its component state to installed, the BMC then copies the machine identity fields to its persistent memory location previously described, such as an electrically-erasable programmable read-only memory device (EEPROM) in local communication with the BMC. The BMC then sets its local component state to installed, and instructs a partner BMC associated with a differing bay, such as bay 4, to begin the synchronization process for the remaining components in the chassis. The BMC in bay 4 then copies from the media tray the machine identity to its own local memory, and sets its state to installed. At this point, the genesis synchronization phase is complete.

To provide synchronization functionality to swappable components such as switches 244, exemplary methodologies are now described. These methodologies apply when the swappable component is placed into a new modular environment, such as a new chassis 200a. While the following methodologies continue the exemplary implementation in BladeCenter® server blade environments, the skilled artisan will appreciate that the same methodologies may be applied in, and tailored to, a variety of situations involving swappable modular components in a variety of modular systems. In one of the exemplary methodologies described, following, the switches (RSSM modules) serve as the swappable modular component in a modular system including a chassis having dual controllers and shared copies of states. However, the skilled artisan will appreciate that additional modular components in modular server blade environments may serve as swappable modular components in other implementations.

As a first step in the exemplary methodology described above, when an RSSM is inserted into a new chassis, the RSSM will query the media tray to determine if the media tray's component state is installed. If the BMC determines that it is installed, it will validate that the machine signature of the media tray matches the local BMC. If a mismatch is determined (which should occur if the RSSM is moving between chassis), the RSSM will then query a partner RSSM (in the opposing I/O module) if the partner RSSM matches the media tray. If a match is found, the RSSM determines that it (the local) is not in sync with the system identity. It will then overwrite its local machine identity with the system identity from the media tray. With this operation, an RSSM can move to any chassis with another RSSM already installed and will take on the identity of the system.

If the RSSM determines that the partner RSSM and the media tray do not match signatures, then the RSSM will query if the local and the partner match signatures. If the local and partner match, the local RSSM will overwrite the media tray machine identity with the factory installed persistent data of the local RSSM. In this case, the two RSSMs override the system identity that was previously there. Thus if two RSSMs in sync are moved from one system to another chassis and inserted at virtually the same time, the identity of the new system will be overwritten. This is by design and is a way that enables moving the identity of one system to a new system.

In one embodiment, a purpose of the foregoing identity transfer mechanism is to support when a media tray is replaced. To the RSSM BMC, replacement of the media tray looks the same as if both RSSM switches are moved to a new chassis. Thus a mechanism is included in the synchronization process that supports the replacement of a media tray.

Figure 2:
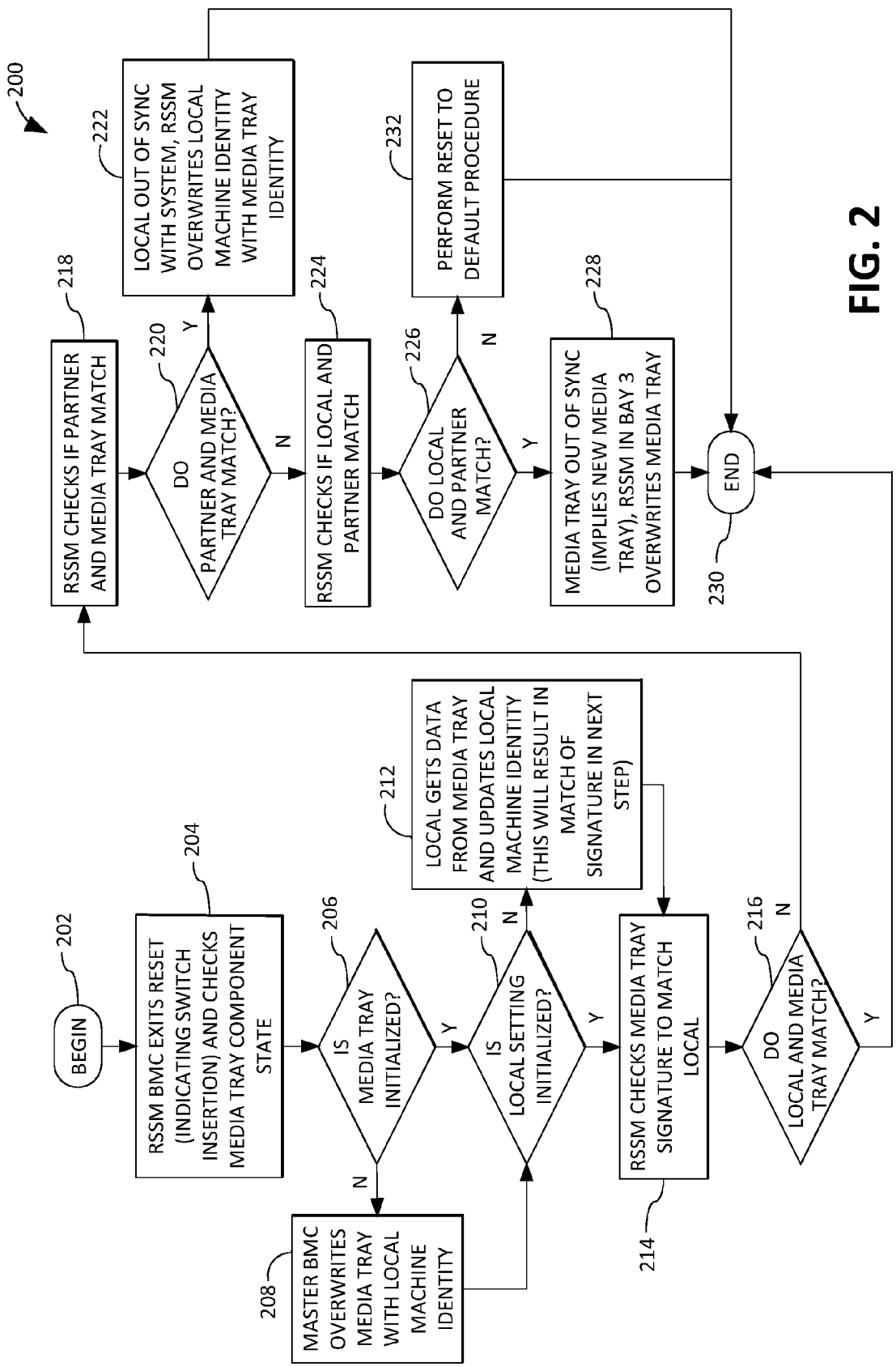
FIG. 2 is a flow chart diagram of an exemplary method for synchronizing a swappable module in a modular system.

Turning to FIG. 2, following, an exemplary method 200 for synchronizing a swappable module in a modular system (again in this case, an RSSM switch between storage systems) is illustrated. Method 200 employs various techniques to determine if storage components match a quorum of identification information in the system. If a match is not determined, for example, a component may then overwrite nonmatching identification information with that of the quorum of identification information. These techniques will be further described, below.

As one skilled in the art will appreciate, various steps in the method 200 (as well as in the following exemplary methods later described) may be implemented in differing ways to suit a particular application. In addition, the described methods may be implemented by various means, such as hardware, software, firmware, or a combination thereof operational on or otherwise associated with the storage environment. For example, a method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 begins (step 202) with an RSSM BMC exiting a reset, indicating a switch insertion. The RSSM queries the media tray component state (step 204). If the media tray is determined not to be initialized (step 206), the master BMC (such as in bay 3) overwrites the media tray with the local machine identification information (step 208). If the media tray is determined to be initialized, the RSSM queries the BMC to determine if the local setting is initialized (step 210). If no, the RSSM receives the identification from the media tray and updates the local machine identity, resulting in a signature match in the next step (step 212).

In the next step, the RSSM queries the media tray to determine if the tray's identification signature matches the local RSSM (step 214). If the local RSSM and the media tray match (step 216), then the method 200 ends (step 230). If the local RSSM and media tray do not match (again, step 216), then the RSSM queries a partner RSSM (in the opposing I/O module) to determine if the partner RSSM and the media tray match (step 218). If a match is found (step 220), then the local RSSM is out of sync with the system. The RSSM then overwrites the local machine identity with that of the media tray (step 222) to match the quorum of identification information of the system, and the method 200 ends (again, step 230).

If the identification information of the partner RSSM and the media tray do not match (again, step 220), the RSSM queries if it and the partner RSSM match identity (step 224). If the local RSSM and the partner RSSM match (step 226), then the identification information of the media tray is out of sync, implying that a new media tray has been inserted. In this case, the RSSM in bay 3 overwrites the identification of the media tray to match the quorum of identification information in the system (step 228).

Returning to step 226, if the identification information of the local RSSM and partner RSSM do not match, then a situation is presented in which three components (local RSSM, partner RSSM, and media tray) have a differing view of what the quorum of identification information should be. Since there is no majority quorum in this case, it is not possible to proceed with synchronization as previously described. In this case, the components in the modular system are not usable since they will not start up properly. A mechanism is necessary that enables the user to move past a state where the identification is not common among at least a quorum of the modular components. In this case, a reset to default procedure is performed (step 232), and the method 200 ends (again, step 230). The reset to default procedure of step 232 allows for component synchronization in situations is more fully detailed in the following exemplary methods.

In one embodiment, and in accordance with the RSSM example described in FIG. 2, the reset to default has two paths that can be executed by the user. The user may choose to reset the switches only such that the media tray machine identity takes precedence, or the user can choose to reset all three elements. In this case, the system takes on the characteristics of a genesis system where all elements are new and the RSSM in bay 3 will propagate its local system machine identity to the rest of the system.

In one embodiment, the advanced management module (AMM) along with the API previously described is used to initiate a reset to default. The AMM provides an interface where a user can select an item such as a switch and reset it to default. For the RSSMs, the user is instructed that a reset to default to bay 3 will reset each component, whereas a reset to bay 4 will only reset the switches as related to the machine identity. Because the reset will potentially change the machine identity the switch currently has locally, both switches are required to be powered off; otherwise the reset is ignored and no change in machine identity will take place.

If the user elects to reset bay 4, the reset signal is only seen by bay 4. The BMC on bay 4 will inform bay 3 that the reset signal was received. Bay 3 will then ensure that both switches are powered off before proceeding with the reset to default. Bay 3 will inform bay 4 it is safe to proceed after this check (if the check clears) and both BMCs will then erase their local machine identity. They will then copy the machine identity of the media tray locally and this will enable the system to begin operating normally.

If the user elects to reset bay 3, bay 3 sees the reset only. The BMC on bay 3 will query to see that both switches are powered off and then proceed (if the check clears). Bay 3 will then erase the media tray data. It will then write the new media tray machine identity using its local system persistent data. It then instructs bay 4 to proceed and both 3 and 4 proceed as described in the case where only the switches are reset.

Notably, if both switches receive the reset to default signal, the method will execute as if only bay 3 identified the signal where everything will get reset. After the reset to default has taken place (either type), the system is now synchronized and ready for normal operation. VPD is consistent across all elements. An alert mechanism may accompany a reset to default procedure to inform the user. The user may be instructed, such as by documentation, that when this alert is received a reset to default is required.

Figure 3A:
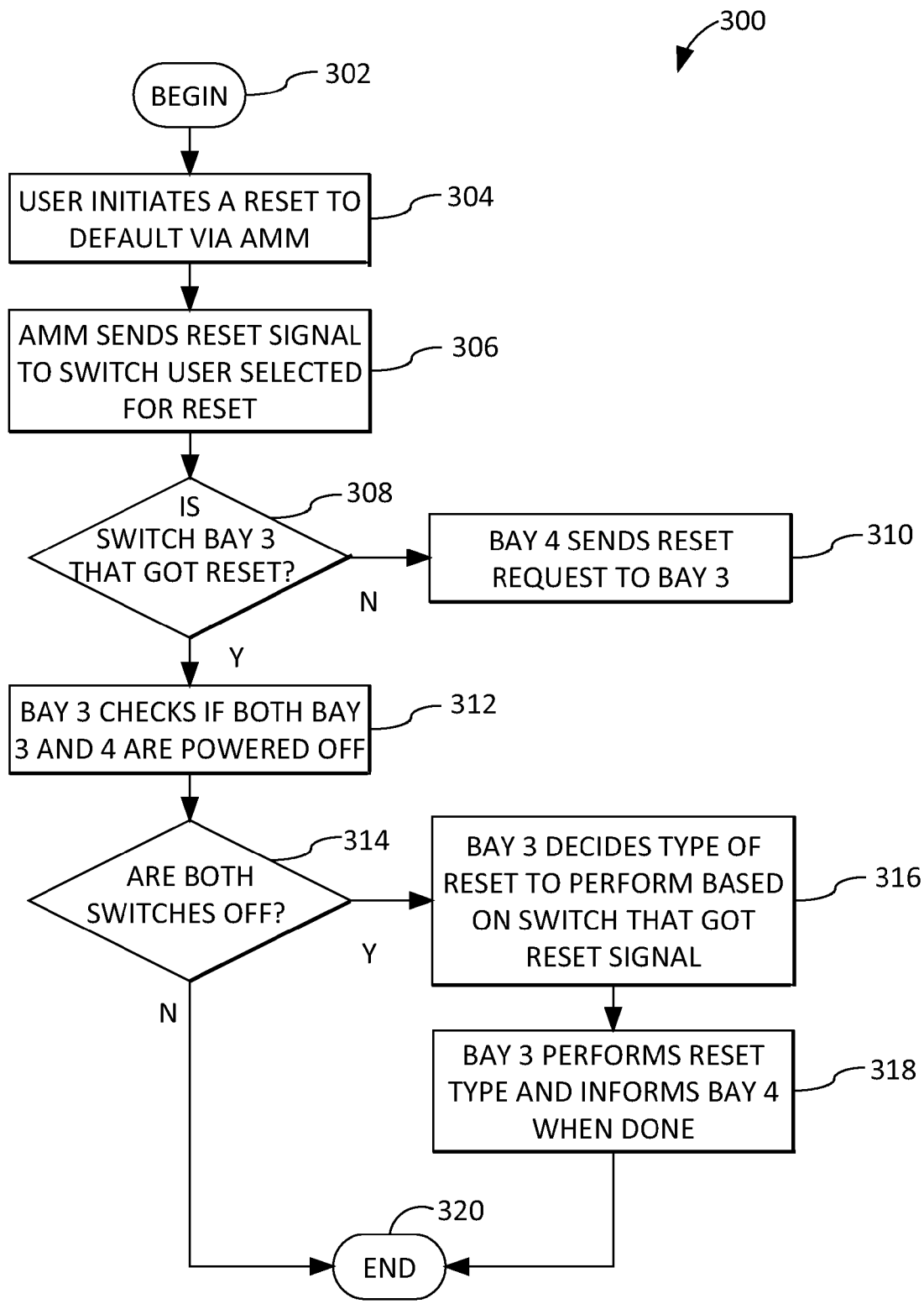
FIG. 3A is a flow chart diagram of an additional exemplary method for synchronizing a swappable module in a modular system.
Figure 3B:
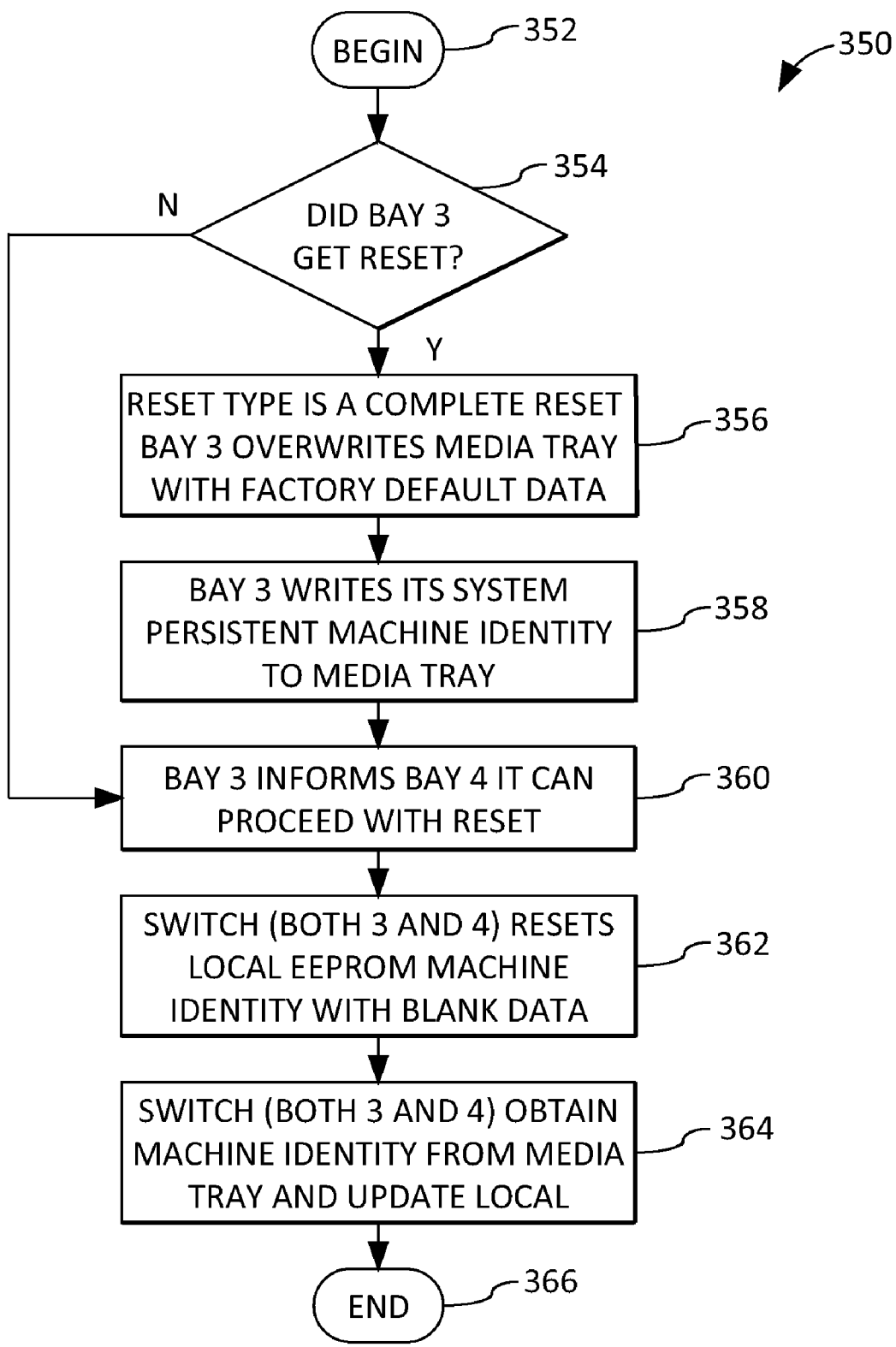
FIG. 3B is a flow chart diagram of an additional exemplary method for synchronizing a swappable module in a modular system.

Methods 300 and 350 in FIGS. 3A and 3B, following, describe exemplary procedures that restore factory defaults in modular components such that the modular components may attain a common VPD state as previously described. Once the modular components are restored to default, they may then proceed to synchronize as necessary such that the modular system will properly operate.

Turning first to FIG. 3A, method 300 begins (step 302) with the user initiating a reset to default via the AMM (step 304) as a follow up to step 232 (FIG. 2). The AMM then sends a reset signal to the RSSM the user selected for reset (based on bay selection) (step 306). If the switch on bay 3 is not reset (step 308), then bay 4 sends the reset request to bay 3, and the process of reset continues as depicted in FIG. 3B. If the switch on bay 3 is reset (again, step 308), then bay 3 queries if both bay 3 and 4 are powered off as previously described (step 312). If both switches are not off, then the method 300 ends (step 320) and must be reinitiated when the switches have been powered off.

If the switches are determined to be both off (again, step 314), then bay 3 determines the type of reset to perform based on the switch that received the reset signal (step 316). Bay 3 then performs the respective reset type and informs bay 4 then the reset is complete (step 318).

Turning now to FIG. 3B, method 350 continues the process first described in FIG. 3A where the user selects a reset to default pursuant to bay 3. Method 350 begins (step 352), with a query as to whether the switch in bay 3 was reset (step 354). If not, the method skips to step 360, where bay 3 informs bay 4 it may proceed with the reset. If bay 3 did get reset (again, step 354), the reset type is a complete reset, with bay 3 overwriting the media tray with factory default identification information (step 356). Bay 3 then writes its system persistent machine identify to the media tray (step 358), and informs bay 4 that it may proceed (again, step 360).

As a following step, the switches in both bays 3 and 4 reset the local EEPROM machine identity with blank identification data (step 362). Both switches then obtain machine identity information from the media tray, and update their local identification information (step 364). The method 350 then ends (step 366).

The reset to default procedures described in FIGS. 3A and 3B may also be operable in a similar fashion in situations where a RSSM module is not present. In the event that one switch is present, and the information in the switch and media tray are mismatching, a quorum is not identified. In such a scenario, the user may be allowed to perform a reset to default. In this situation, if the single identified switch is associated with bay 4, the local VPD is overwritten in favor of the media tray. Conversely, if the single identified switch is associated with bay 3, both media tray and local switch VPD is replaced by the factory installed VPD of the switch associated with bay 3.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for synchronizing a swappable module between storage systems, each having dual controllers and distributed copies of states, comprising:
   upon an insertion of the swappable module in a storage system, querying a plurality of storage components, including a partner swappable module, to determine if a quorum of identification information is present, wherein:
      if the quorum of identification information is present, overwriting at least one of the plurality of storage components having non-matching identification information with the identification information of the quorum, and
      if the quorum of identification information is not present, performing a reset to default procedure, wherein the reset to default procedure designates at least as many storage components of the plurality of storage components with the identification information sufficient to constitute the quorum.

2. The method of claim 1, wherein the overwriting at least one of the plurality of storage components is performed by a baseboard management controller (BMC) of the storage system, wherein the baseboard management controller is placed in communication with the swappable module upon the insertion of the swappable module in the storage system.

3. The method of claim 1 wherein querying the plurality of storage components includes querying a media tray of the storage system to determine if the media tray is initialized in the storage system, wherein if the media tray is determined to be not initialized, the media tray is overwritten with the identification information of the quorum.

4. The method of claim 3, wherein if the media tray is determined to be initialized, identification information of the media tray is compared against identification information of the swappable module, wherein if a match between the media tray and the swappable module is not determined:
   the identification information of the media tray is compared against identification information of the partner swappable module in the storage system, further wherein if a match between the media tray and the partner swappable module is determined, the identification information of the swappable module is overwritten with the identification information of the quorum.

5. The method of claim 4, wherein if the match between the identification information of the media tray and the identification information of the swappable module is determined, the identification information of the swappable module is compared against the identification information of the partner swappable module, wherein:
   if a match between the swappable module and the partner swappable module is determined, the identification information of the media tray is overwritten with the identification information of the quorum, and
   if the match between the swappable module and the partner swappable module is not determined, the reset to default procedure is performed.

6. The method of claim 1, wherein performing the reset to default procedure includes performing a reset of a portion of the plurality of the storage components pursuant to a request of a user.

7. A method for synchronizing a swappable module between storage systems, each having dual controllers and distributed copies of states, comprising:
 upon an insertion of the swappable module in a storage system, querying a plurality of storage components, including a partner swappable module, to determine if a quorum of identification information is present, wherein:
  if the quorum of identification information is present, overwriting at least one of the plurality of storage components having non-matching identification information with the identification information of the quorum, and
  if the quorum of identification information is not present, performing a reset to default procedure, wherein the reset to default procedure is performed pursuant to a selection of bays in the storage system by a user, and further wherein:
   if a user selects the reset to default procedure pursuant to a first bay, using identification information of one of the plurality of the storage components to designate the identification information of the quorum for a remainder of the plurality of the storage components, and
   if the user selects the reset to default procedure pursuant to a second bay, using persistent identification information stored in the storage system to designate the identification information of the quorum for each of the plurality of the storage components.

8. The method of claim 7, wherein using the identification information of the one of the plurality of the storage components includes using identification information of a media tray of the storage subsystem to designate the identification information of the quorum for the remainder of the plurality of the storage components.

9. The method of claim 8, wherein using persistent data stored in the storage system includes:
 overwriting the identification of the media tray with the persistent identification information, and
 using the persistent identification information of the media tray to designate the identification information of the quorum for a remainder of the plurality of the storage components.

10. The method of claim 9, wherein if the user selects the reset to default procedure pursuant to the first bay:
 informing the second bay that the reset to default procedure was selected, and
 subsequent to the informing the second bay that the reset to default procedure was selected and previous to the using the identification information of the one of the plurality of the storage components to designate the identification information of the quorum for the remainder of the plurality of the storage components, erasing identification information of the remainder of the plurality of storage components.

11. The method of claim 7, further including, if the quorum is not present, alerting the user that the reset to default procedure is required.

12. A system for synchronizing a swappable module between storage systems, each having dual controllers and distributed copies of states, comprising:
 a baseboard management controller (BMC) and a management module (MM), each in communication with the swappable module, wherein upon an insertion of the swappable module in a storage system, the swappable module queries a plurality of storage components, including a partner swappable module, to determine if a quorum of identification information is present, and further wherein:
  if the quorum of identification information is present, at least one of the plurality of storage components having non-matching identification information is overwritten with the identification information of the quorum by one of the baseboard management controller and the swappable module, and
  if the quorum of identification information is not present, a reset to default procedure initiated by the management module is performed, wherein the reset to default procedure designates at least as many storage components of the plurality of storage components with the identification information sufficient to constitute the quorum.

13. The system of claim 12, wherein the swappable module queries a media tray of the storage system to determine if the media tray is initialized in the storage system, wherein if the media tray is determined to be not initialized, the media tray is overwritten with the identification information of the quorum by the BMC.

14. The system of claim 13, wherein if the media tray is determined to be initialized, the swappable module compares identification information of the media tray against identification information of the swappable module, wherein if a match between the media tray and the swappable module is not determined:
 the swappable module compares the identification information of the media tray against identification information of the partner swappable module in the storage system, and further wherein if a match between the media tray and the partner swappable module is determined, the identification information of the swappable module is overwritten with the identification information of the quorum by the swappable module.

15. The system of claim 14, wherein if the match between the identification information of the media tray and the identification information of the swappable module is determined, the swappable module compares the identification information of the swappable module against the identification information of the partner swappable module, wherein:
 if a match between the swappable module and the partner swappable module is determined, the identification information of the media tray is overwritten with the identification information of the quorum by the swappable module and
 if the match between the swappable module and the partner swappable module is not determined, the reset to default procedure is performed.

16. A system for synchronizing a swappable module between storage systems, each having dual controllers and distributed copies of states, comprising:
 a baseboard management controller (BMC) and a management module (MM), each in communication with the swappable module, wherein swappable module is adapted for, upon an insertion of the swappable module in a storage system, querying a plurality of storage components, including a partner swappable module, to determine if a quorum of identification information is present, wherein:
  if the quorum of identification information is present, at least one of the plurality of storage components having non-matching identification information is overwritten with the identification information of the quorum by the BMC, and
  if the quorum of identification information is not present, a reset to default procedure initiated by the management module is performed, wherein the reset to default procedure is performed pursuant to a selection of bays in the storage system by a user, and further wherein:
if the user selects the reset to default procedure pursuant to a first bay, identification information of one of the plurality of the storage components is used to designate the identification information of the quorum for a remainder of the plurality of the storage components, and
if the user selects the reset to default procedure pursuant to a second bay, persistent identification information associated with the BMC is used to designate the identification information of the quorum for each of the plurality of the storage components.

17. The system of claim 16, wherein the BMC is adapted for, pursuant to using the identification information of the one of the plurality of the storage components, using identification information of a media tray of the storage subsystem to designate the identification information of the quorum for the remainder of the plurality of the storage components.

18. The system of claim 16, wherein the BMC is adapted for, pursuant to using persistent data stored in the storage system:
overwriting the identification of the media tray with the persistent identification information, and
using the persistent identification information of the media tray to designate the identification information of the quorum for a remainder of the plurality of the storage components.

19. The system of claim 16, wherein the BMC is adapted for, if the user selects the reset to default procedure pursuant to the first bay:
informing the second bay that the reset to default procedure was selected, and
subsequent to the informing the second bay that the reset to default procedure was selected and previous to the using the identification information of the one of the plurality of the storage components to designate the identification information of the quorum for the remainder of the plurality of the storage components, erasing identification information of the remainder of the plurality of storage components.

20. A computer program product for synchronizing a swappable module between storage systems, each having dual controllers and distributed copies of states, the computer program product comprising a computer-readable storage medium having computer-readable program code portions stored therein, the computer-readable program code portions comprising:
a first executable portion for, upon an insertion of the swappable module in a storage system, querying a plurality of storage components, including a partner swappable module, to determine if a quorum of identification information is present, wherein:
if the quorum of identification information is present, overwriting at least one of the plurality of storage components having non-matching identification information with the identification information of the quorum, and
if the quorum of identification information is not present, performing a reset to default procedure, wherein the reset to default procedure designates at least as many storage components of the plurality of storage components with the identification information sufficient to constitute the quorum.

21. The computer program product of claim 20 wherein the first executable portion for querying the plurality of storage components is adapted for querying a media tray of the storage system to determine if the media tray is initialized in the storage system, wherein if the media tray is determined to be not initialized, the media tray is overwritten with the identification information of the quorum.

22. The computer program product of claim 21, further including a second executable portion for, if the media tray is determined to be initialized, comparing identification information of the media tray against identification information of the swappable module, wherein if a match between the media tray and the swappable module is not determined:
the identification information of the media tray is compared against identification information of the partner swappable module in the storage system, further wherein if a match between the media tray and the partner swappable module is determined, the identification information of the swappable module is overwritten with the identification information of the quorum.

23. A computer program product for synchronizing a swappable module between storage systems, each having dual controllers and distributed copies of states, the computer program product comprising a computer-readable storage medium having computer-readable program code portions stored therein, the computer-readable program code portions comprising:
a first executable portion for, upon an insertion of the swappable module in a storage system, querying a plurality of storage components, including a partner swappable module, to determine if a quorum of identification information is present, wherein:
if the quorum of identification information is present, overwriting at least one of the plurality of storage components having non-matching identification information with the identification information of the quorum, and
if the quorum of identification information is not present, performing a reset to default procedure, wherein the reset to default procedure is performed pursuant to a selection of bays in the storage system by a user, and further wherein:
if a user selects the reset to default procedure pursuant to a first bay, using identification information of one of the plurality of the storage components to designate the identification information of the quorum for a remainder of the plurality of the storage components, and
if the user selects the reset to default procedure pursuant to a second bay, using persistent identification information stored in the storage system to designate the identification information of the quorum for each of the plurality of the storage components.

24. The computer program product of claim 23, wherein the first executable portion is adapted for, pursuant to using the identification information of the one of the plurality of the storage components, using identification information of a media tray of the storage subsystem to designate the identification information of the quorum for the remainder of the plurality of the storage components.

25. The method of claim 8, wherein the first executable portion is adapted for, pursuant to using persistent data stored in the storage system:
overwriting the identification of the media tray with the persistent identification information, and
using the persistent identification information of the media tray to designate the identification information of the quorum for a remainder of the plurality of the storage components.

* * * * *